(12) United States Patent
Sanetick et al.

(10) Patent No.: US 7,784,773 B1
(45) Date of Patent: Aug. 31, 2010

(54) ISOLATOR USEFUL FOR IN-LINE MOUNTING WITH A STRUT

(75) Inventors: Robert M. Sanetick, Orchard Park, NY (US); Jeffrey N. Weisbeck, East Aurora, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 12/535,317

(22) Filed: Aug. 4, 2009

(51) Int. Cl.
*F16F 9/00* (2006.01)
(52) U.S. Cl. .................. 267/205; 244/17.11; 244/17.27
(58) Field of Classification Search ................. 188/129; 267/205–209; 244/17.11, 17.27
See application file for complete search history.

(56) References Cited

U.S. PATENT DOCUMENTS

| | | | |
|---|---|---|---|
| 3,727,862 A | 4/1973 | Kaufhold et al. |
| 3,836,100 A | 9/1974 | Von Hardenberg et al. |
| 4,214,738 A | 7/1980 | Casper |
| 4,604,940 A | 8/1986 | Mendelsohn et al. |
| 4,634,081 A | 1/1987 | Chee |
| 4,717,094 A | 1/1988 | Chee |
| 4,810,003 A | 3/1989 | Pinch et al. |
| 5,108,045 A | 4/1992 | Law et al. |
| 5,351,930 A | 10/1994 | Gwinn et al. |
| 5,538,229 A | 7/1996 | Kmiec |
| 5,687,948 A | 11/1997 | Whiteford et al. |
| 5,725,181 A | 3/1998 | Hey |
| 5,788,262 A | 8/1998 | Dazy et al. |
| 5,788,372 A | 8/1998 | Jones et al. |
| 5,820,078 A | 10/1998 | Harrell |
| 5,820,079 A | 10/1998 | Harrell |
| 6,003,849 A | 12/1999 | Davis et al. |
| 6,022,005 A | 2/2000 | Gran et al. |
| 6,022,600 A | 2/2000 | Schmidt et al. |
| 6,029,959 A | 2/2000 | Gran et al. |
| 6,247,687 B1 | 6/2001 | Jensen et al. |
| 6,328,293 B1 | 12/2001 | Olsen |
| 6,378,831 B1 | 4/2002 | Copeland, Jr. |
| 6,378,851 B1 | 4/2002 | McGuire |
| 6,471,198 B2 | 10/2002 | Herbst |
| 6,581,874 B2 | 6/2003 | Whiteford et al. |
| 6,715,591 B2 | 4/2004 | Davis |
| 6,871,820 B2 | 3/2005 | Wilksch |
| 6,920,966 B2 | 7/2005 | Buchele et al. |
| 7,419,121 B2 | 9/2008 | Williams |
| 2002/0079630 A1 | 6/2002 | Bachmeyer et al. |
| 2006/0032974 A1 | 2/2006 | Williams |
| 2006/0144050 A1 | 7/2006 | Williams |
| 2006/0202400 A1 | 9/2006 | Fitzgerald |
| 2008/0136071 A1 | 6/2008 | Weisbeck et al. |

FOREIGN PATENT DOCUMENTS

| | | | |
|---|---|---|---|
| WO | WO 2007-062421 A1 | 5/2007 |
| WO | WO 2008-060681 A2 | 5/2008 |

*Primary Examiner*—Christopher P Schwartz
(74) *Attorney, Agent, or Firm*—Hiscock & Barclay, LLP

(57) ABSTRACT

A system for limiting the exchange of shock and vibration motions and forces between a load and its supporting structure including an isolator. In one aspect, the isolator is designed for in-line mounting with a support strut. The isolator includes an elastomer member that may be substantially permanently maintained in a compression/shear state.

18 Claims, 5 Drawing Sheets

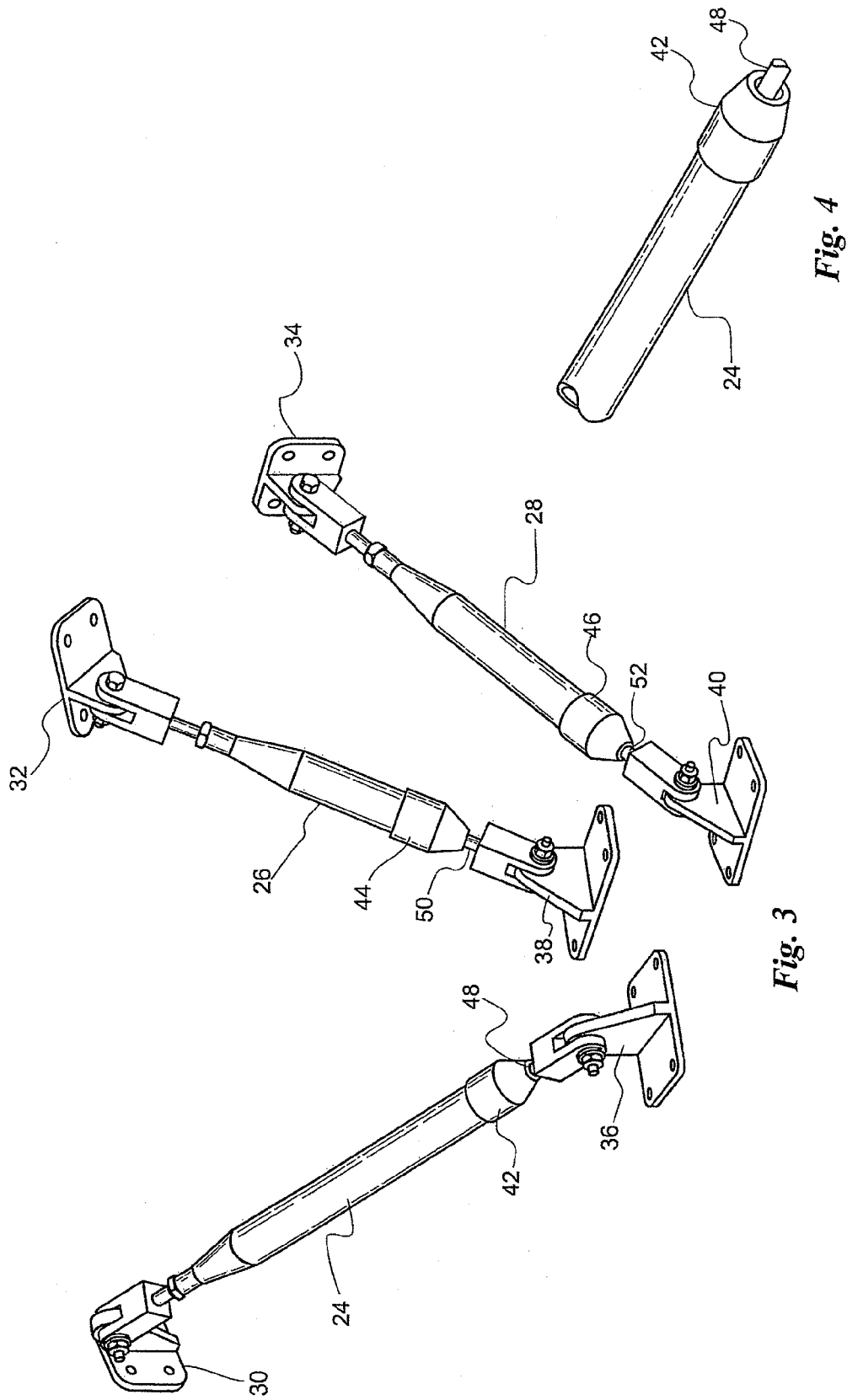

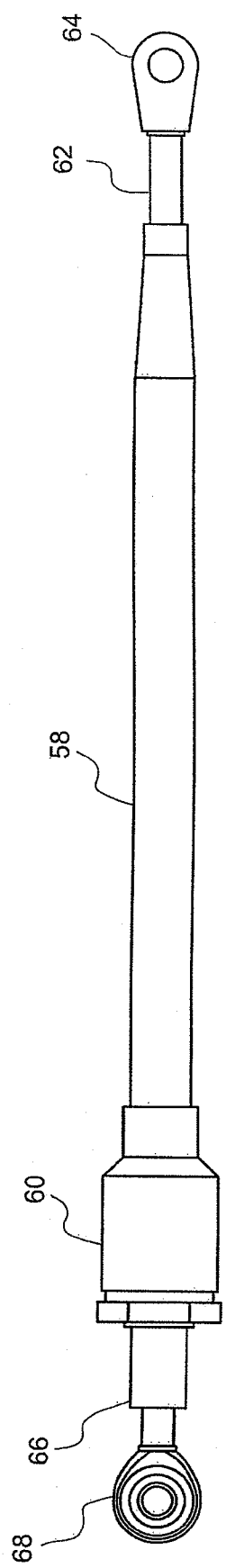
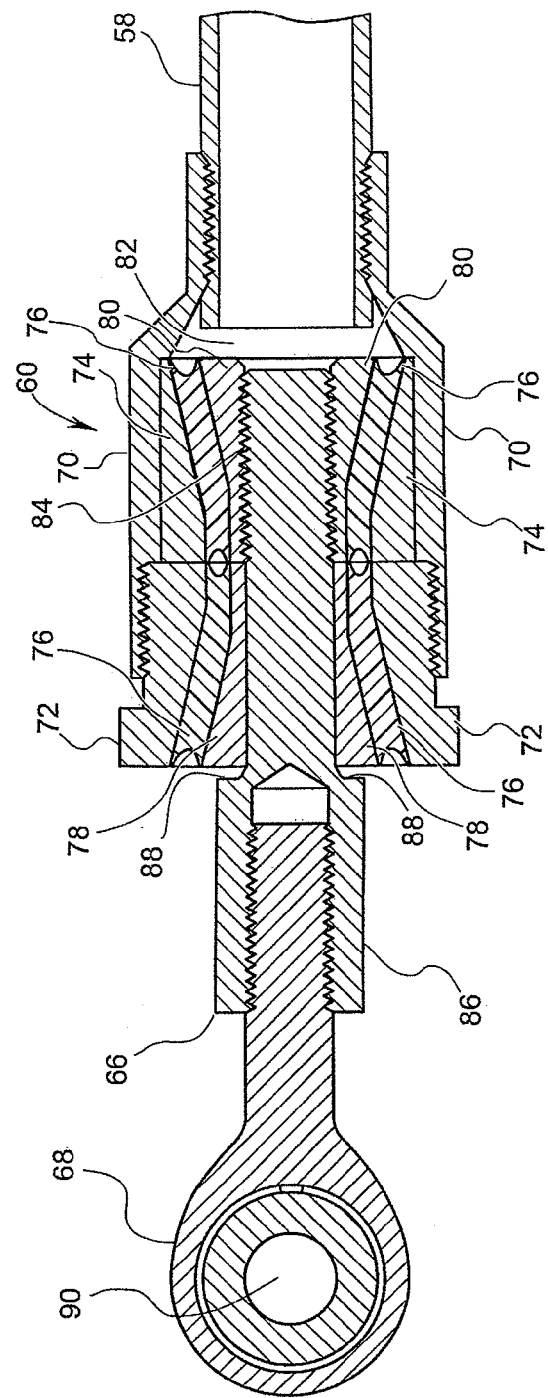
Fig. 8
Fig. 9

ISOLATOR USEFUL FOR IN-LINE MOUNTING WITH A STRUT

FIELD OF THE INVENTION

The present invention generally relates to devices for controlling shock and vibration motions and forces, especially those transmitted through struts that mount auxiliary power units in aircraft.

BACKGROUND OF THE INVENTION

Isolators have been used to minimize the transmission of shock and vibrations between objects. Isolators have been especially used in connection with systems for mounting motors and other power units in aircraft. Typically, such power units are suspended and mounted within the aircraft through a plurality of mounting struts that extend between the power unit and the aircraft structure. Shock and vibrations from the power unit are reduced by the isolators resulting in a lower vibration level on the aircraft structure. Reciprocally, the shock and vibrations from the aircraft structure are reduced by the isolators resulting in lower levels on the power unit.

A number of isolators have been designed with fluids, elastomers, and wire mesh. Typically, a single isolator is mounted directly to the power unit and the ends of one or more struts are pivotably mounted to the isolator, with the other ends of the struts pivotably mounted to the fuselage. Such an arrangement requires an isolator to provide isolation and support the load from many different directions or vectors. Also, if an isolator is connected to a plurality of struts, then defective performance or breakage of an isolator may result in the transmission of undesirable vibrations through a plurality of struts between the fuselage and the power unit.

SUMMARY OF THE INVENTION

The present invention general relates to a system for limiting the exchange of shock and vibration motions and forces between a load and its supporting structure including an isolator. In one respect, the isolator is designed for in-line mounting with a support strut. The isolator includes an elastomer member that may be substantially permanently maintained in a compression/shear state.

BRIEF DESCRIPTION OF THE DRAWINGS

The invention will be described with reference to the accompanying drawings wherein.

FIG. 3 is a perspective view of a diagram of a strut and isolator system in accordance with one embodiment of the present invention;

FIG. 4 is a perspective view of a portion of the strut and isolator system shown in FIG. 3;

FIG. 8 is a plan view of a strut and isolator system as shown in FIG. 7; and

FIG. 9 is a schematic cross-sectional illustration of a portion of the strut and isolator system shown in FIGS. 7 and 8.

DESCRIPTION OF A PREFERRED EMBODIMENT

Figures 1, 2:
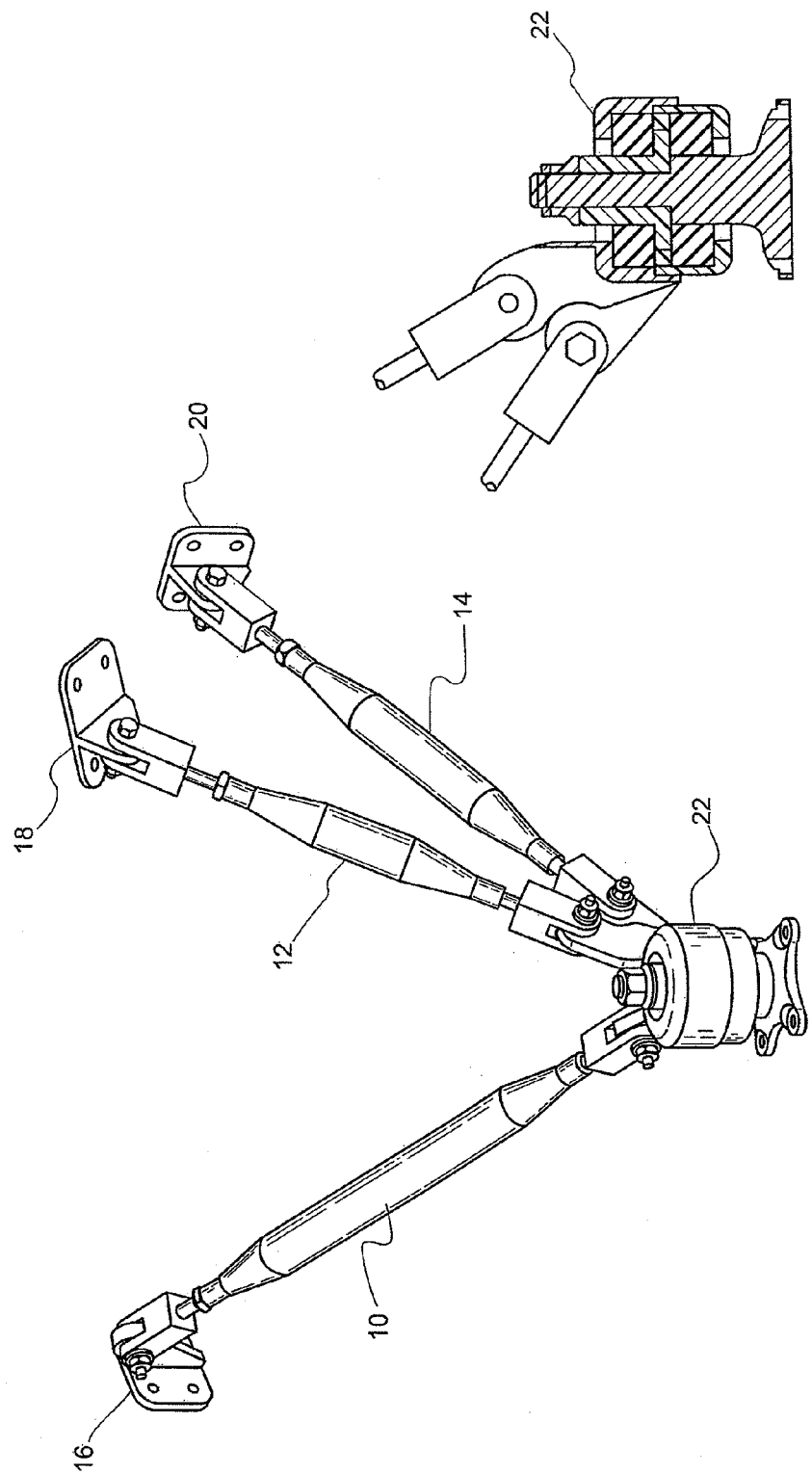
FIG. 1 is a perspective view of a diagram of a prior art strut and isolator system.
FIG. 2 is a schematic diagram in partial cross-section of a portion of the prior art strut and isolator system shown in FIG. 1.

The invention will be described with reference to the accompanying drawings wherein like reference numerals refer to the same item. Although the following description will refer to an "isolator", such term should not be viewed as limiting, but includes similar devices known by other names, such as vibration dampers. Also, although the following description will reference a specific environment of using the isolator in connection with a power unit in an aircraft, it should be recognized that the invention has utility in other environments as well.

There is shown in FIG. 1 a schematic illustration of a prior art strut and isolator assembly that generally includes three struts 10, 12, 14, three attachment plates 16, 18, 20 pivotably mounted on corresponding ends of the struts 10, 12, 14 and adapted to be attached to a fuselage of an aircraft or other supporting structure, and an isolator 22 to which the other ends of the struts 10, 12, 14 are pivotably mounted. The isolator 22 is mounted to an auxiliary power unit, or some other source of vibration.

As previously mentioned, the prior art isolator 22 may include fluids, elastomers, or wire mesh that help isolate vibratory forces from the power unit or fuselage so that they are limited and minimized in connection with transmitting those vibrations through the supporting struts 10, 12, 14. An inspection of FIG. 2 will demonstrate that in the prior art system, especially when a plurality of struts are attached to the isolator 22, the loads supported by the isolator are in many different directions or vectors. Consequently, these prior art systems must be larger to support the complex loading and are thus prone to being heavier. The isolators are also mounted near the power unit which is typically much hotter than away from the power unit at the other end of the strut.

In a preferred embodiment of the present invention, an isolator is designed for in-line mounting to a corresponding strut. As such, the isolator may be fashioned of a more simple lighter weight design, is less prone to deterioration and damage, can be mounted away from the power unit, and, in the event that any isolator does deteriorate or fail, the transmission of vibratory forces affects only a single strut.

Figure 5:
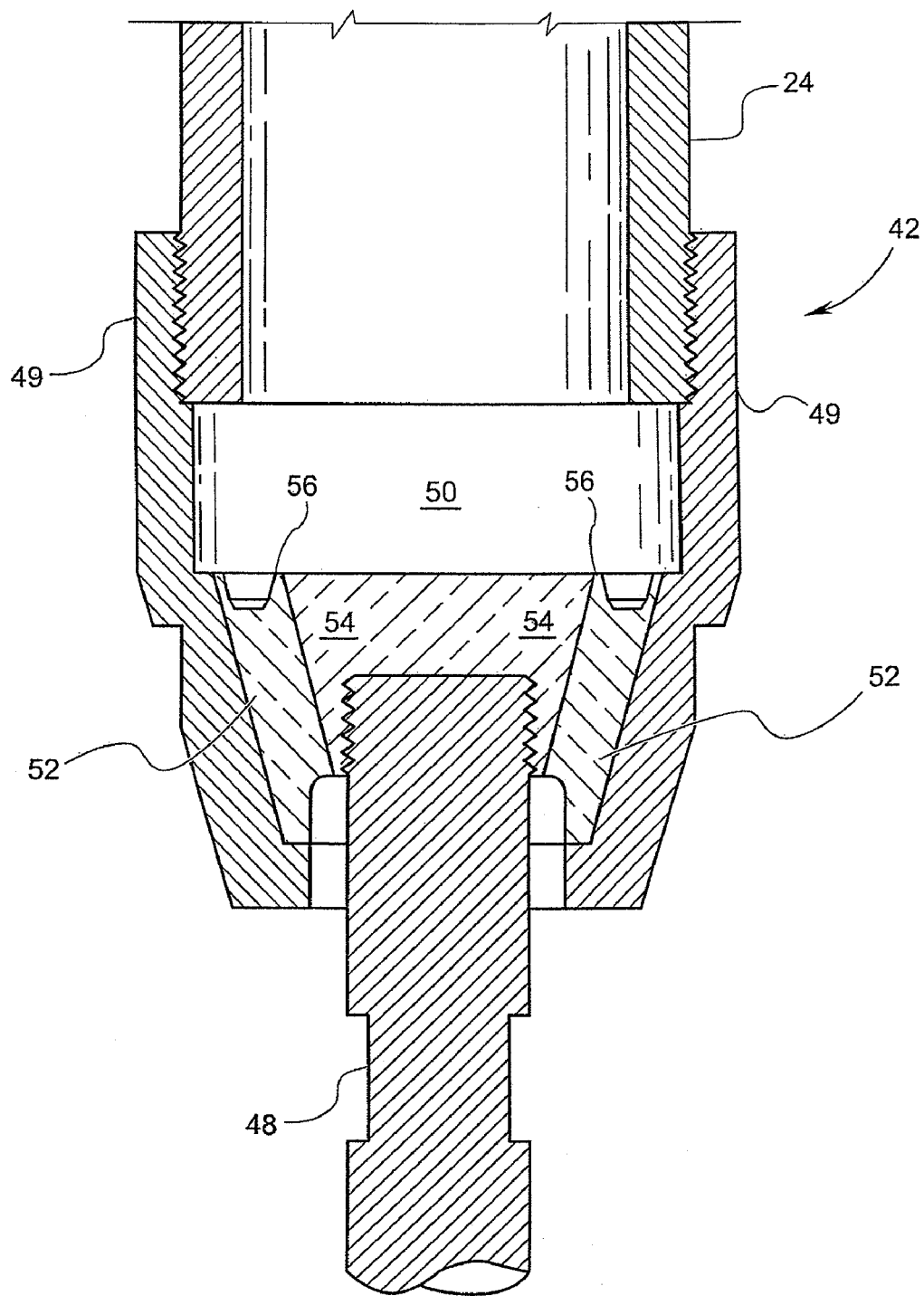
FIG. 5 is a schematic, cross-sectional illustration of a portion of the strut and isolator system shown in FIG. 4.
Figure 7:
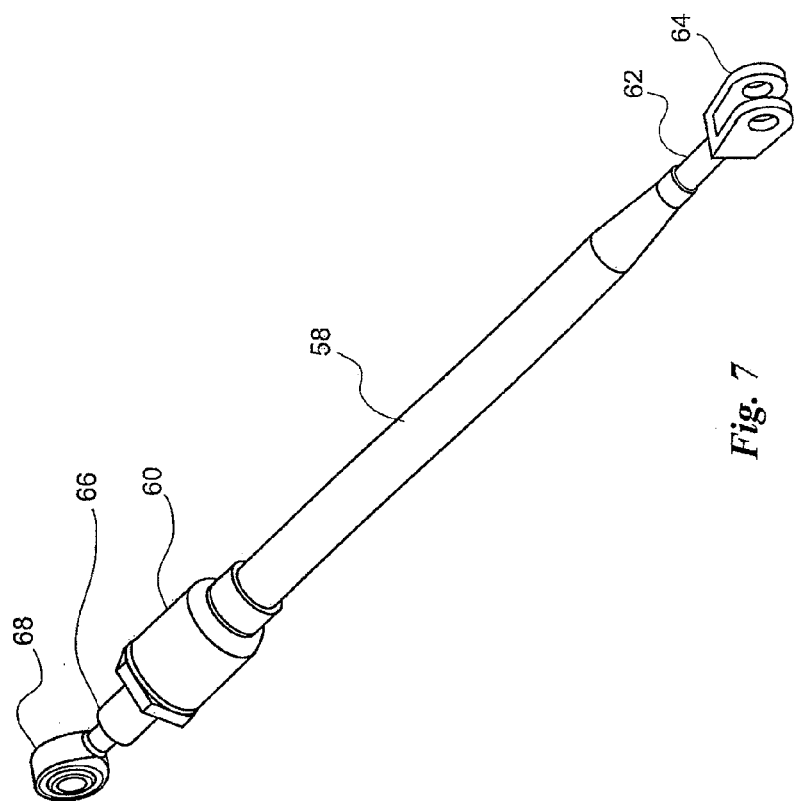
FIG. 7 is a perspective diagram of a single strut and isolator system as shown in FIG. 6.

One embodiment of the present invention is shown in FIGS. 3, 4, and 5. As shown in FIG. 3, each strut system may include one or more struts 24, 26, and 28 each of which includes a generally cylindrical tube section. One end of each strut 24, 26, and 28 is pivotably connected to a corresponding attachment plate 30, 32, and 34 to the fuselage or other support structure. The other end of each strut 24, 26, and 28 is pivotably connected to a corresponding mounting plate 36, 38, and 40 to which a power unit or other load may be mounted. Mounted at the end of each strut 24, 26, and 28 is a corresponding isolator 42, 44, and 46 that is linked to a corresponding mounting plate 36, 38, and 40 via a corresponding post or rod 48, 50 and 52.

The details of the isolator 42 and its relationship with the strut 24 and the rod 48 are shown in FIGS. 4 and 5. The strut 24 may be fashioned as a generally cylindrical tube, however other configurations are also contemplated for use in connection with the present invention. The exterior surface of the strut 24 adjacent to the isolator 42 is threaded. The isolator 42 includes a generally cylindrical housing 49. The inner peripheral surface of the housing 49 disposed adjacent to the strut 24 is also threaded so that the housing 49 may be selectively, threadably secured to the strut 24. The other end of the housing 49 possesses a preferably circular aperture through which the rod 48 extends. The assembly also includes a void region 50 within the housing 49 near and beneath the end of the strut 24. The isolator 42 further includes an elastomeric element 52 substantially in the form of a conical tube. The elastomeric element 52 may be fashioned of a wide variety of materials, including silicone and black rubber. The outer peripheral surface of the elastomeric element 52 conformingly abuts against an inner peripheral surface of the housing 49. Preferably the elastomeric element 52 is bonded, such as through a vulcanized bond, with the housing 49.

The isolator 42 also includes a wedge 54 generally fashioned in a frusto-conical configuration, with the outer peripheral surface of the wedge 54 in conforming engagement with the interior surface of the elastomeric element 52. The wedge 54 is preferably bonded, such as through vulcanized bonding, to the elastomeric element 52. The wedge 54 also includes a central, axial bore hole or cavity. The interior surface of the wedge 54 defining the cavity may include a recessed region that is threaded. One end of the rod 48 extends through the circular opening of the housing 49 and possesses a threaded exterior surface that is adapted to be threadably secured to the threaded region of the wedge 54. As shown in FIG. 5, preferably there is a gap between the outer peripheral surface of the rod 48 and the inner surface of both the housing 49 and the elastomeric element 52, so that the rod 48 may wiggle relative to the housing 49 and the strut 24. It will also be appreciated that alternatively, the wedge 54 and the rod 48 may be of a unitary construction.

As shown in FIG. 5, an end of the elastomeric element 52 may be provided with an annular groove 56 or be beveled, which permits more ready deformation of the elastomeric element 52.

Note that the widest part of the wedge 54 is wider than the circular opening of the housing 49 so that wedge 54 is captured by, and cannot escape from, the housing 49, which provides a fail-safe feature in the event that there is a failure of the elastomeric element 52.

Figure 6:
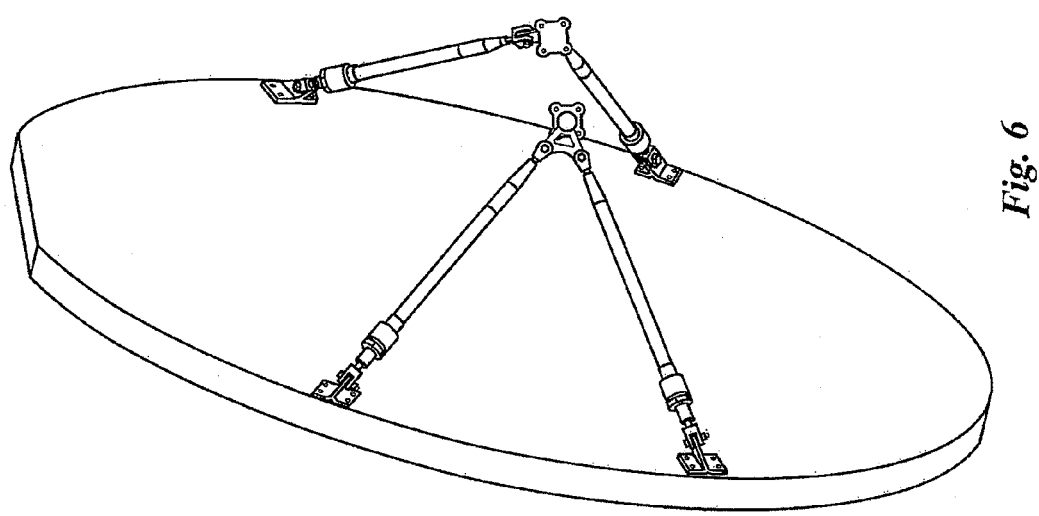
FIG. 6 is a perspective view of a diagram of a strut and isolator system in accordance with another embodiment of the present invention.

There is shown in FIGS. 6-9 another embodiment of the present invention. FIG. 6 depicts how a strut and isolator assembly in accordance with this embodiment may be pivotably mounted on an aircraft fuselage. The strut and isolator assembly includes a cylindrical, tubular strut 58 and isolator 60 mounted at one end of the strut 58 and a post or rod 62 extending from one end of the strut 58. A clevis or spherical rod end 64 is mounted on the distal end of the rod 62 and may be pivotably attached to a mounting plate attached to a power unit. A second post or rod 66 extends from the isolator 60. A clevis or spherical rod end 68 may be mounted on the distal end of the second rod 66.

The details of the isolator 60 and its relationship to the strut 58 and the rod 66 are best shown in FIG. 9. Isolator 60 includes a generally cylindrical, tubular housing 70. The internal surface of one end of the housing 70 is threaded and is adapted to be threadably secured to the threaded exterior surface of one end of the strut 58. The internal surface of the other end of the housing 70 is also threaded.

The isolator 60 also includes an outer collar circumferentially disposed within and adjacent to the housing 70. The collar includes a first ring member 72 and a second ring member 74. The exterior surface along one end of the first ring member 72 is threaded and is adapted to be threadably secured to the threaded end of the housing 70 opposite to the strut 58. The second ring member 74 may translatably, longitudinally float within the housing 70.

The isolator 60 further includes an elastomeric element 76 fashioned substantially in the form of a pair of tubes possessing conical or flared ends. As shown in FIG. 9, the tubes are oriented in back-to-back, or opposing, directions. The inner peripheral surfaces of the ring members 72, 74 and the outer peripheral surfaces of the tubes of the elastomeric elements 76 are fashioned to conformingly engage in an abutting relationship. Preferably, the elastomeric elements 76 possess a substantially uniform thickness. The elastomeric elements 76 may be fashioned from a wide variety of materials, including silicon and black rubber. Also, the ends of each tube of the elastomeric elements 76 may be fashioned with annular grooves or may be beveled.

The isolator 60 further includes a first ring-shaped wedge section 78 and a second ring-shaped wedge section 80. The peripheral outer surfaces of the wedge sections 78, 80 and the peripheral inner surfaces of the tubes of the elastomeric elements 76 are configured substantially to conform in an abutting relationship. The interior surfaces of the wedge sections 78, 80 form a contiguous, cylindrical cavity. The region of interface between the wedge sections 78, 80 is generally co-planar with the region of interface between the ring members 72, 74 of the outer collar and the region of interface between the tubes of the elastomeric elements 76. As will be appreciated from reviewing FIG. 9, the outer collar, the elastomeric elements 76, and the wedge sections 78, 80 are concentrically arranged within the housing 70. The front and rear elastomeric elements 76 are vulcanize bonded to ring members 72, 74 and wedge sections 78, 80. During the elastomer molding process, the wedge sections 78, 80 will be held in the mold to protrude outboard of the ring members 72, 74. A void region 82 exists between the end of the rear elastomeric element 76 and the second ring-shaped wedge section 80 and the end of the strut 58.

The rod 66 may be fashioned with an inner segment 84 and an outer segment 86. The inner segment 84 includes a first cylindrical end adapted to extend conformingly through the bore hole formed by the interior surfaces of the wedge sections 78, 80. The other end of the rod segment 84 has a larger diameter whereby a lip 88 is formed to restrain or abut an end of the first wedge section 78. The portion of the leading end of the rod segment 84 possesses a threaded periphery adapted to threadably engage an inner peripheral threaded surface of the second wedge section 80. By rotating the rod 66, the wedge sections 78, 80 will be drawn together, whereby the elastomeric members 76 are then placed in a condition of compression/shear. This insures the elastomer is always in compression/shear when the strut is loaded in tension or compression.

With reference to FIG. 9, it will also be appreciated that the widest diameter of the wedge sections 78, 80 are larger than the smallest internal diameter of each of the ring members 72, 74 so that the rod segment 84, when threadably connected to the wedge section 80, is captured by, and cannot escape from, the housing 70. Again, such construction offers a fail-safe configuration.

The spherical rod end 68 is formed with a spherical ball joint 90 that is adapted to engage a supporting plate. As shown in FIG. 9, an end of the spherical rod end 68 is threadably received within an axial cavity of the rod segment 86, however, it should be appreciated that the rod 66 and rod end 68 may be fashioned of a unitary, single piece of material.

Preferably the housing 70, the ring members 72, 74, and the wedge sections 78, 80 are each formed of metal, however, they may be formed of other suitable materials.

Adjustments to the overall effective length of the strut and isolator assemblies may be accomplished in manners known to those skilled in the art.

While exemplary embodiments have been presented in the foregoing description of the invention, it should be appreciated that a vast number of variations within the scope of the invention may exist. The foregoing examples are not intended to limit the nature or the scope of the invention in any way. Rather, the foregoing detailed description provides those skilled in the art with a foundation for implementing other exemplary embodiments of the invention.

We claim:

1. A system for limiting the exchange of shock and vibration motions and forces between a load and a supporting structure, said system including:

at least one substantially cylindrical strut having an axial centerline passing through an outboard end and an inboard end of said strut;

an outboard end post that is substantially coaxially aligned with the axial centerline of said strut, said outboard end post having a proximal end disposed toward said strut and a distal end disposed away from said strut, the distal end of said outboard end post being adapted for connection to the structure;

an inboard end post that is substantially coaxially aligned with said axial centerline of said strut, said inboard end post having a proximal end disposed toward said strut and a distal end disposed away from said strut, the distal end of said inboard end post being adapted for connection to the load; and isolation means acting between at least one of said end posts and said strut for limiting the exchange of vibratory forces between said at least one end post and said strut and in which said isolation means includes an elastomeric element substantially symmetrically situated around said axial centerline and at least partially around said at least one post and wherein said elastomeric element is fashioned substantially in the form of at least one conical tube, said elastomeric element being further disposed about the exterior surface of a wedge, said wedge having an interior threaded portion connected to one of said structure and said load via a threaded rod.

2. A system according to claim 1 wherein said elastomeric element is fashioned substantially in the form of two tubes possessing flared ends.

3. A system according to claim 2 further including means for pre-stressing the elastomeric element in compression/shear.

4. A system according to claim 2 wherein said elastomeric element is fashioned from at least one of a unitary, single piece of material, and of two pieces of material.

5. A system according to claim 1 wherein said inboard end post distal end includes at least one of a clevis and a spherical ball joint.

6. A system according to claim 1 wherein said outboard end post distal end includes at least one of a clevis and a spherical ball joint.

7. A system according to claim 1 wherein said limiting means is adapted to be removably attached to said strut.

8. A system according to claim 1 wherein said elastomeric element is disposed out of contact with said at least one end post.

9. A system according to claim 1 further including means for pre-stressing the elastomeric element in compression/shear.

10. An isolator adapted to dampen vibrations transmitted by a strut, said isolator comprising:

a substantially tubular housing having a first end that includes a threaded surface adapted to be threadably secured to a correspondingly threaded region on a surface of the strut and a second end forming a substantially circular opening;

an elastomeric element formed as a conical tube, said elastomeric element having an outer surface adapted to conformingly engage an interior surface of said housing; and a wedge having a substantially conical region, the outer surface of which is adapted to conformingly engage the interior surface of said elastomeric element, the largest diameter of said conical region being larger than the diameter of the substantially circular opening in the second end of said housing, said wedge having an interior threaded portion that is threadingly secured to a rod extending away from the second end of said housing.

11. A system according to claim 10 wherein said elastomeric element includes an annular groove along at least one end thereof.

12. A system according to claim 10 wherein said elastomeric element is at least one of bonded and unbonded to said housing and said wedge.

13. An isolator according to claim 10, including an annular gap provided between said rod and said housing and said rod and said elastomeric element to enable said rod to wiggle.

14. An isolator adapted to dampen vibrations transmitted by a strut, said isolator including:

a substantially tubular housing possessing a first end having a threaded surface adapted to be threadably secured to a correspondingly threaded region on the surface of the strut and a second end having a threaded surface;

an outer collar circumferentially disposed within and adjacent to said housing, said collar including a first ring member and a second ring member, said first ring member having a threaded surface adapted to be threadably secured to the threaded surface of the second end of said housing;

an elastomeric element fashioned substantially in the form of a tube possessing at least one flared end, the peripheral outer surface of said elastomeric element configured substantially to conform in an abutting relationship with the inner peripheral surfaces of at least one of said ring members;

an inner collar including a first ring-shaped wedge section and a second ring-shaped wedge section, the peripheral outer surfaces of at least one of said wedge sections configured substantially to conform in an abutting relationship with the inner peripheral surface of said elastomeric element, the inner peripheral surface of one of said wedge sections being threaded; and a rod possessing a first end adapted to extend through the inner collar, such that said inner collar, said elastomeric element, said outer collar, and said housing are substantially concentrically arranged therearound, said first rod end having a threaded surface adapted to be threadably secured to the threaded inner peripheral surface of said one of said wedge sections, whereby, when said rod is rotated, said second wedge section translates relative to said rod to thereby change the degree of compression/shear in said elastomeric element.

15. An isolator according to claim 14 wherein said elastomeric element possesses a substantially uniform thickness.

16. An isolator according to claim 14 wherein a clevis or spherical ball joint is mounted at the second end of said rod.

17. An isolator according to claim 14 wherein said housing, said outer collar, and said inner collar are each fashioned substantially entirely of metal.

18. An isolator according to claim 14 wherein said elastomeric element is substantially constantly maintained during use in state of compression/shear.

* * * * *